United States Patent
Chen et al.

[11] Patent Number: 6,146,041
[45] Date of Patent: Nov. 14, 2000

[54] SPONGE MOP WITH CLEANING TANK ATTACHED THERETO

[76] Inventors: He-Jin Chen, No. 17, Alley 33, Lane 24, Sec 3, Chung Yang Road, Lung-Ching Hsiang, Taichung Hsien; Chia-Yi Hsieh, No. 357-2, Chung Hua Road, Wu-Chi Town, Taichung Hsien, both of Taiwan

[21] Appl. No.: 09/487,659

[22] Filed: Jan. 19, 2000

[51] Int. Cl.[7] .................................................. A46B 11/00
[52] U.S. Cl. .......................... 401/140; 401/270; 401/283; 401/203
[58] Field of Search .................................. 401/140, 270, 401/282, 283, 284, 203, 207, 204, 205, 138; 15/119.1, 119.2

[56] References Cited

U.S. PATENT DOCUMENTS

| | | | |
|---|---|---|---|
| 1,091,888 | 3/1914 | Lorzing | 401/140 |
| 2,641,011 | 6/1953 | Caronia | 401/140 |
| 3,210,794 | 10/1965 | Vosbikian | 401/140 |
| 5,865,551 | 2/1999 | Lalli et al. | 401/139 |
| 6,000,088 | 12/1999 | Wright et al. | 15/119.2 |

*Primary Examiner*—David J. Walczak
*Attorney, Agent, or Firm*—Bacon & Thomas, PLLC

[57] ABSTRACT

A sponge mop includes a handle having an assembly frame connected to a lower end thereof and a cleaning tank is connected to the assembly frame. The assembly frame has two separated parts and each part having a roller connected thereto so that a sponge is connected between the two rollers. A lever member is pivotally connected to the handle and two siderails are connected between the sponge and the lever member. A valve is connected between the cleaning tank and the sponge so that when operating the valve to an open position, the detergent in the tank flows to the sponge.

5 Claims, 5 Drawing Sheets

SPONGE MOP WITH CLEANING TANK ATTACHED THERETO

FIELD OF THE INVENTION

The present invention relates to a sponge mop having a cleaning tank attached thereto and the detergent flows to the sponge to enhance cleaning work.

BACKGROUND OF THE INVENTION

A conventional sponge mop is shown in FIG. 5 and generally includes a handle 60 having an operation frame pivotably connected thereto. The handle 60 further has a serrated top section 61 connected to a top thereof. The operation frame includes a lever member 73 with two arms 74 connected to the handle 60, two siderails 72 are pivotably connected to the two arms 74. A squeezing assembly 62 includes two rollers 63 connected thereto and a sponge 70 has its a ridge 71 on a top thereof be located between the two rollers 63. The two siderails 72 extend through the squeezing assembly 62 and are fixedly connected to the ridge 71. When pulling the lever member 73 upward, the two siderails 72 will lift the sponge 70 to be squeezed between the two rollers 63 so that the contaminated water in the sponge 70 is squeezed out from the sponge 70. Nevertheless, the user always uses detergent to remove the dirty portion on the ground or the floor before using the sponge mop. In other words, most of the dirty portion cannot be removed by using water so that the user have to take two separated actions and uses different tools to deal with the dirty portions.

The present invention intends to provide a sponge mop that has a cleaning tank connected thereto and the detergent in the tank may flow into the sponge by operating a valve on the handle to enhance cleaning feature.

SUMMARY OF THE INVENTION

In accordance with one aspect of the present invention, there is provided a sponge mop and comprising a handle having an assembly frame connected to a lower end thereof and two rollers respectively connected to two parts of the assembly frame. A lever member is pivotally connected to the handle and a sponge is located between the two parts. Two siderails are connected between the sponge and the lever member. A cleaning tank is connected to the assembly frame and a valve is connected between the cleaning tank and the sponge.

The object of the present invention is to provide a sponge mop that has a cleaning tank connected thereto so that detergent flows into the sponge by operating a valve.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 4A is a side elevational view, partly in section, of the valve connected to the cleaning tank, wherein the valve is at its open position.

DETAILED DESCRIPTION OF THE PREFERRED EMBODIMENT

Figure 1:
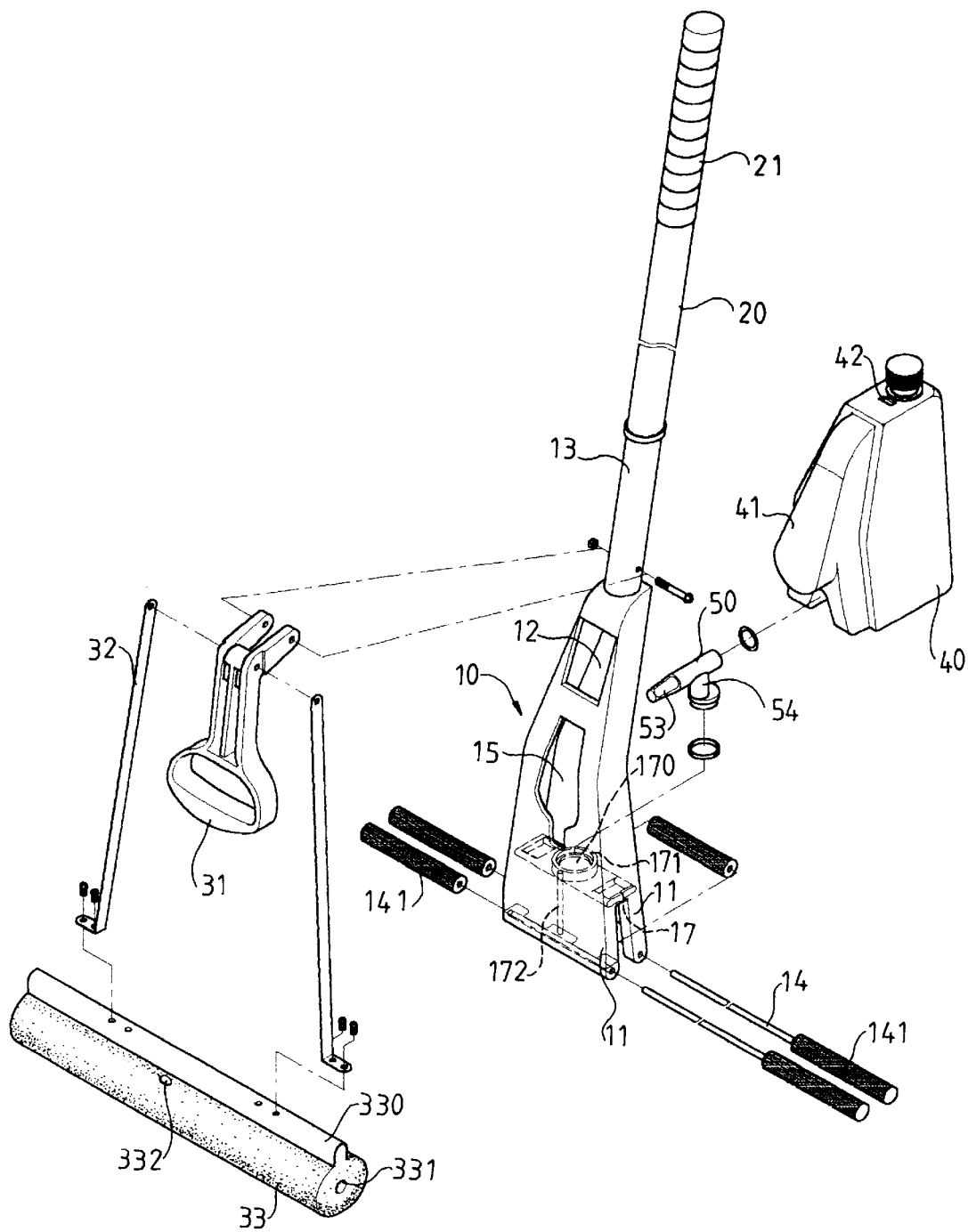
FIG. 1 is an exploded view to show the sponge mop of the present invention.
Figure 2:
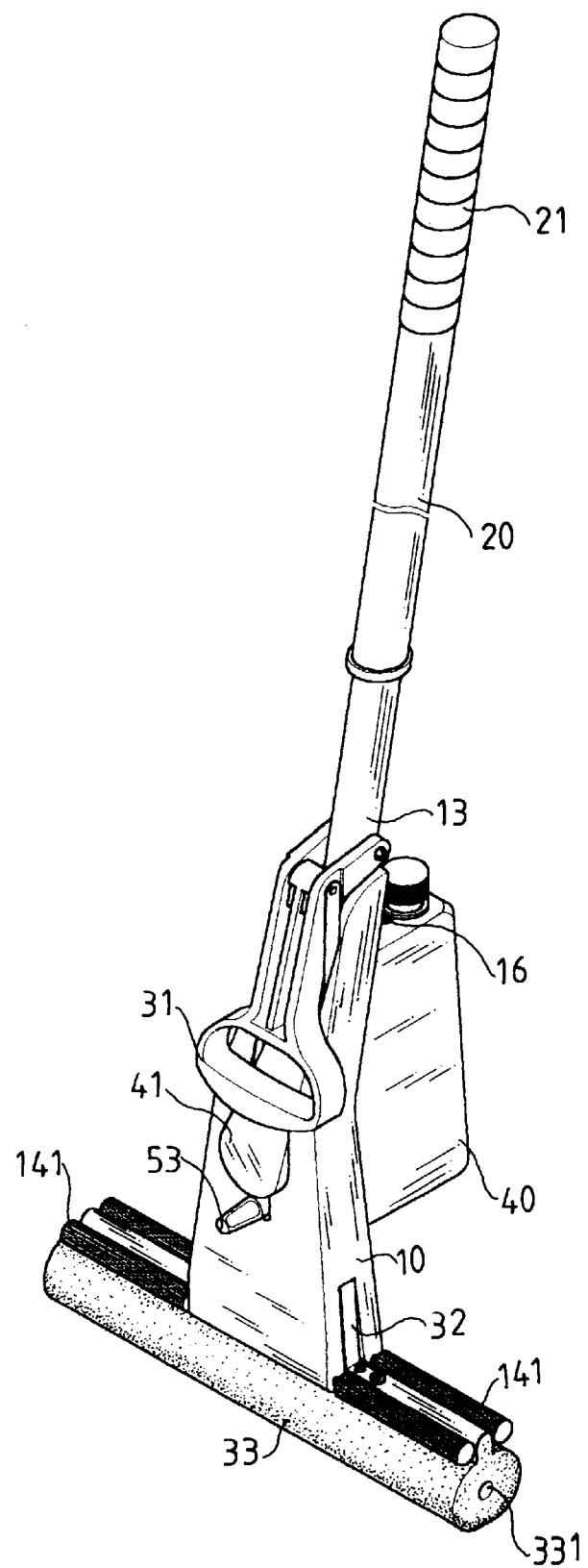
FIG. 2 is a perspective view to show the sponge mop of the present invention.
Figure 3:
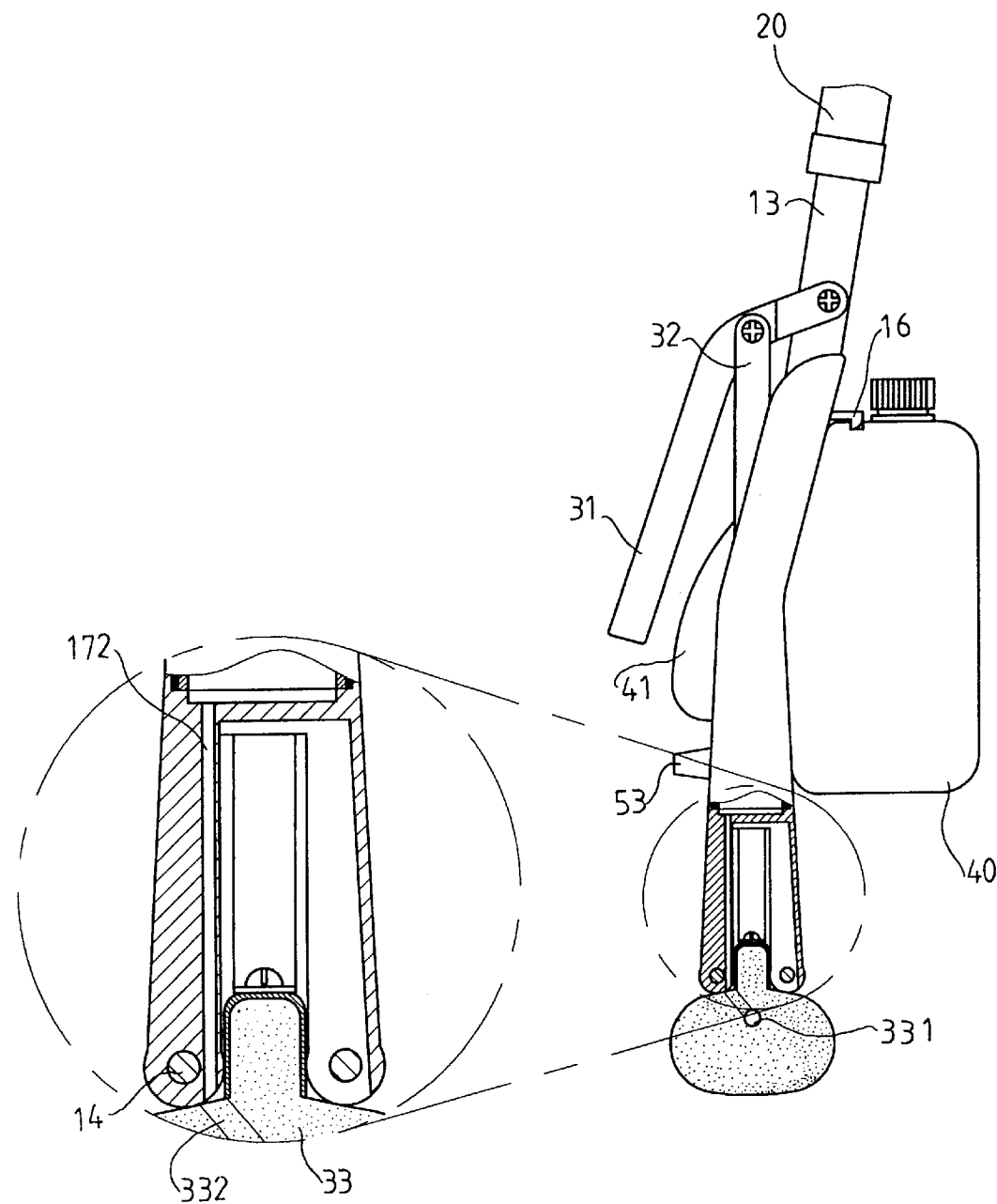
FIG. 3 is a side elevational view, partly in section, of the engagement between the assembly frame, the sponge and the passage communicating the sponge and the assembly frame.

Referring to FIGS. 1 to 3, the sponge mop in accordance with the present invention comprises a handle 20 having an assembly frame 10 connected to a lower end thereof and a serrated section 21 connected to a top of the handle 20. The assembly frame 10 has a tubular portion 13 on a first end thereof for mounting onto the handle 20 and two separated parts 11 are located on a second end of the assembly frame 10. The two parts 11 are connected by a connection plate 17 and each part 11 has a roller 141 connected thereto. A hole 170 is defined through the connection plate 17 and a neck 171 extends from the connection plate 17 and encloses the hole 170. A passage 172 is defined through one of the two parts 11 and communicates with the hole 170. The assembly frame 10 further has a hole 12 and a slot 15 defined therethrough.

A sponge 33 has a ridge 330 extending therefrom and the ridge 330 is located between the two parts 11. Two siderails 32 extend through the hole 12 and are connected to the ridge 330 of the sponge 33. A lever member 31 is pivotably connected to the handle 20 so that when lifting the lever member 31, the sponge 33 is lifted and squeezed by the rollers 141. A cleaning tank 40 has a notch 42 defined in a top thereof and a hook 16 extends from the handle 20 so that the hook 16 is engaged with the notch 42. The tank 40 further has a nose 41 extending therefrom and the nose 41 is engaged with the slot 15. A valve 50 is connected between the cleaning tank 40 and the sponge 33.

Figure 4:
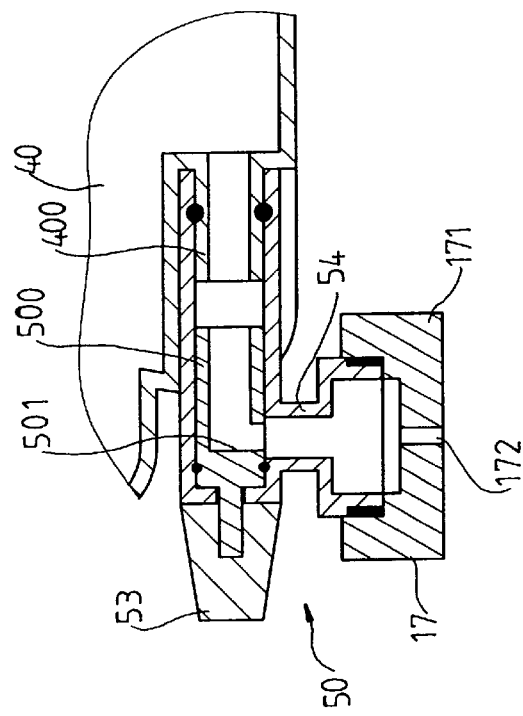
FIG. 4 is a side elevational view, partly in section, of the valve connected to the cleaning tank, wherein the valve is at its closed position.
Figure 4:
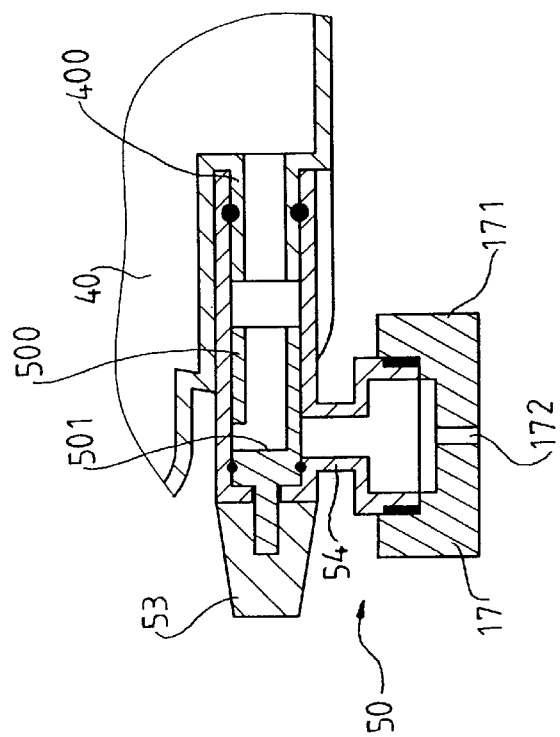
Figure 5:
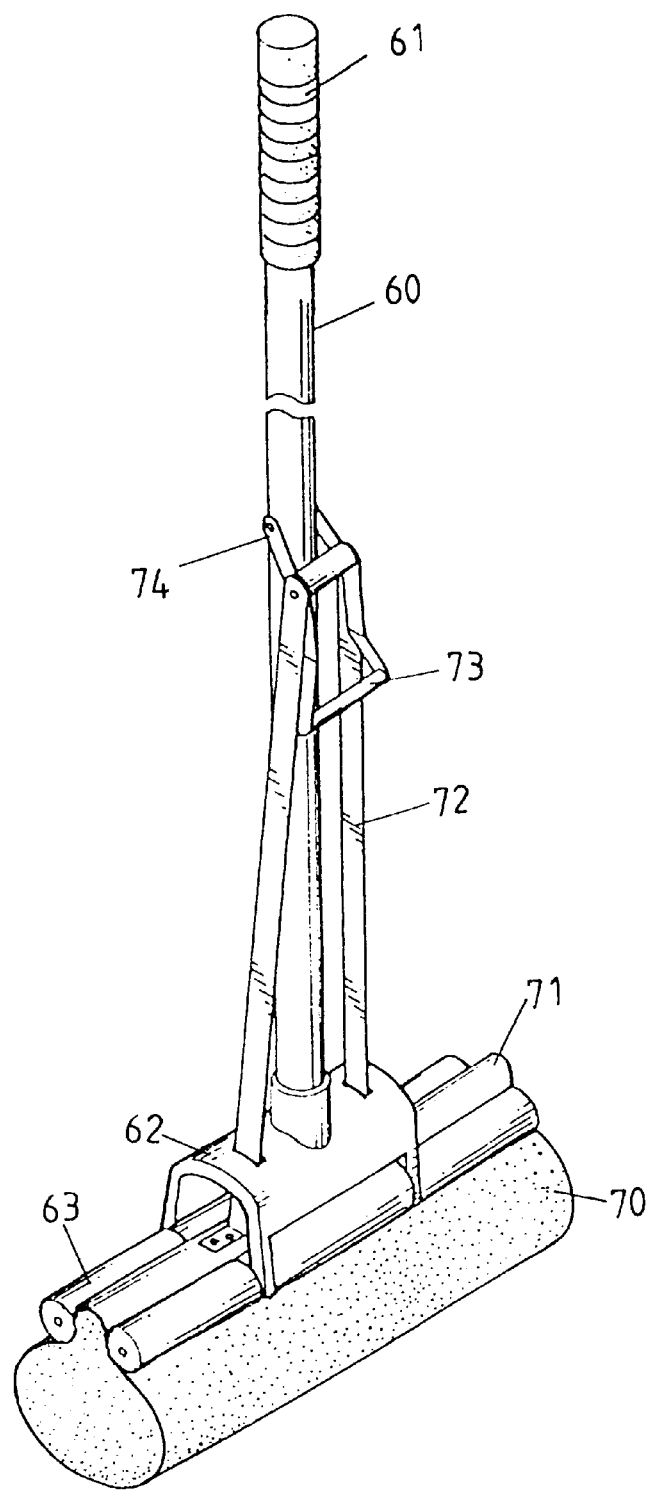
FIG. 5 is a perspective view to show a conventional sponge mop.

Referring to FIGS. 4 and 4A, the valve 50 has an extension portion 54 engaged with the neck 171 so that the passage 172 communicates with an interior of the extension portion 54 of the valve 50 and the hole 170. An engaging hole 332 is defined radially in the sponge 33 and communicating with the passage 172. A tube 400 extends from the cleaning tank 40 and communicates with an interior of the cleaning tank 40. The valve 50 is mounted to the tube 400 and has an inner tube 500 rotatably received in the valve 50. A knob 53 is connected to the inner tube 500 so that the inner tube 500 is rotatable by rotating the knob 53. The inner tube 500 has a radial hole 501 defined therethrough so that when rotating the inner tube 500 to an open position, the radial hole 501 is moved to communicate with the interior of the extension portion 54 of the valve 50 as shown in FIG. 4A and the detergent in the leaning tank 40 flows into the passage 172 via the tube 400 and the inner tube 500 and the detergent is absorbed by the sponge 33. A longitudinal passage 331 is defined through the sponge 33 and communicates with the engaging hole 332 of the sponge 33 as shown in FIG. 3 so that the detergent will be absorbed by the sponge 33 evenly.

Accordingly, the sponge mop of the present invention carries a cleaning tank 40 with the handle 20 so that the user can rotate the knob 53 of the valve 50 to let detergent flow to the sponge 33 to effectively remove dirty portion of the ground.

While we have shown and described various embodiments in accordance with the present invention, it should be clear to those skilled in the art that further embodiments may be made without departing from the scope and spirit of the present invention.

What is claimed is:

1. A sponge mop comprising:

a handle having an assembly frame connected to a lower end thereof and said assembly frame having two separated parts, each part having a roller connected thereto, a connection plate connected between said two parts, a hole defined through said connection plate and a neck extending from said connection plate and enclosing said hole, a lever member pivotally connected to said handle;

a sponge having a ridge extending therefrom and said ridge located between said two parts, two siderails connected between said ridge of said sponge and said lever member; and a cleaning tank connected to said assembly frame and a valve connected between said cleaning tank and said sponge, said valve having an extension portion engaged with said neck, a passage defined through one of said two parts and communicating with an interior of said extension portion of said valve and said hole, and an engaging hole defined radially in said sponge and communicating with said passage.

2. The sponge mop as claimed in claim 1 further comprising a tube extending from said cleaning tank and communicating with an interior of said cleaning tank, said valve mounted to said tube and having an inner tube rotatably received in said valve, said inner tube having a radial hole defined therethrough and communicating with said interior of said extension portion of said valve when rotating said inner tube to an open position.

3. The sponge mop as claimed in claim 1 further comprising a longitudinal passage defined through said sponge and communicating with said engaging hole of said sponge.

4. The sponge mop as claimed in claim 1, wherein said assembly frame has a slot defined therethrough, said cleaning tank having a nose extending therefrom and said nose engaged with said slot.

5. The sponge mop as claimed in claim 1, wherein said cleaning tank has a notch defined in a top thereof and a hook extends from said handle so that said hook is engaged with said notch.

* * * * *